United States Patent [19]

Kawada

[11] Patent Number: 4,768,122
[45] Date of Patent: Aug. 30, 1988

[54] MOVEABLE LID FOR TAPE CASSETTE
[75] Inventor: Hideaki Kawada, Kanagawa, Japan
[73] Assignee: Sony Corporation, Tokyo, Japan
[21] Appl. No.: 757,880
[22] Filed: Jul. 23, 1985
[30] Foreign Application Priority Data Jul. 23, 1984 [JP] Japan ................................. 59-111225
Sep. 10, 1984 [JP] Japan ................................. 59-136917

[51] Int. Cl.$^4$ ............................................. G11B 23/02
[52] U.S. Cl. ..................................... 360/132; 242/199
[58] Field of Search ............................. 360/132, 96.1; 242/197–201; 206/387

[56] References Cited

U.S. PATENT DOCUMENTS

| 3,925,820 | 12/1975 | Esashi et al. | 360/132 |
| 4,214,719 | 5/1986 | Kato | 360/132 X |
| 4,225,100 | 9/1980 | Sugawara | 360/132 X |
| 4,235,395 | 11/1980 | Wardenaar et al. | 360/132 X |
| 4,389,690 | 6/1983 | Oishi et al. | 360/132 |
| 4,408,733 | 10/1983 | Ooishi et al. | 242/199 |
| 4,541,581 | 9/1985 | Hara | 360/132 X |
| 4,643,304 | 2/1987 | Sumida et al. | 360/132 |

Primary Examiner—Stuart N. Hecker
Assistant Examiner—David J. Severin
Attorney, Agent, or Firm—Lewis H. Eslinger; Jay H. Maioli

[57] ABSTRACT

A tape cassette of the kind that can be obtained in various sizes dependent upon the length of the tape contained therein is provided with a lid that protects the tape across the front threading area of the cassette. The lid extends for a distance less than the length of the front wall of the tape cassette, and the lid is provided with side elements that extend into the front wall of the tape cassette and that cooperate with tape reel locking elements and lid locking elements located inside the tape cassette. By providing a shorter length lid mechanical problems caused by long lids needed for larger size cassettes are avoided.

4 Claims, 3 Drawing Sheets

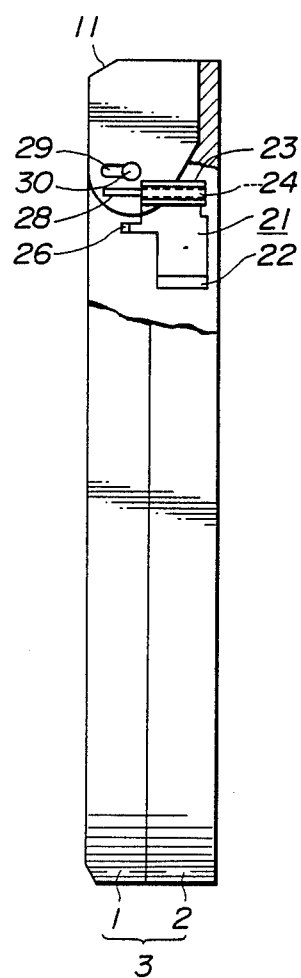
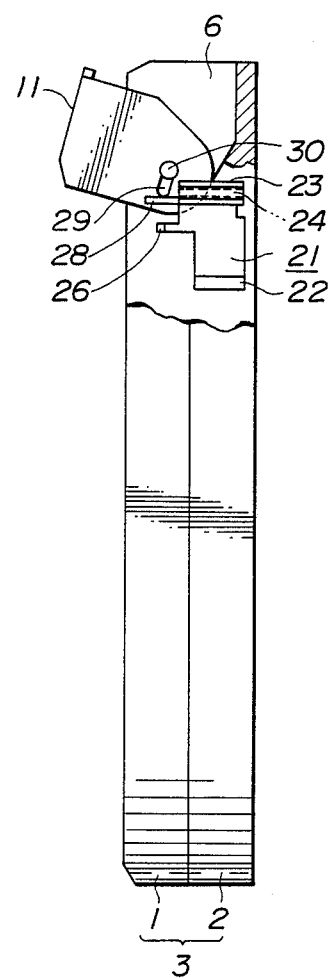

MOVEABLE LID FOR TAPE CASSETTE

FIELD OF THE INVENTION

This invention relates to a tape cassette used with a recording and/or reproducing device, such as VTR. More particularly, it relates to such tape cassette provided with a cover or lid adapted for overlying or covering the portion of the magnetic tape that extends towards the outer front side of the cassette proper.

BACKGROUND OF THE INVENTION

In a tape cassette used with a recording and/or reproducing device, such as VTR, equipped with rotative magnetic heads, a portion of the magnetic tape is brought to the outer front side of the cassette proper, in order that the magnetic tape may be automatically extracted by tape extracting means of the recording and/or reproducing device and placed about the rotative magnetic head by loading means of the recording and/or reproducing device. On the front side of the cassette proper, there is provided a recessed area into which the tape extracting unit is to be introduced for extracting the magnetic tape, that is, a treading area. On the front side of the cassette proper, there is further provided a lid or cover for overlying and protecting the portion of the tape facing to the outer front side of the cassette proper. Such lid or cover of the conventional tape cassette has angularly arranged side sections pivotally supported by the side wall sections of the cassette proper so that the lid may be partially rotated for opening or closing the front side of the tape cassette.

There is also known a recording and/or reproducing device filed in the name of the present Applicant, wherein tape cassettes with different tape lengths are provided in different sizes depending on such different tape lengths can be used for recording and/or reproduction by the same device. Despite the difference in the cassette size, the tape cassettes used with this type of the recording and/or reproducing device are provided with the threading area of the same design in order that the magnetic tape may be extrated using the same tape extraction unit, thereby assuring interchangeability between the different size cassettes. Since the magnetic tape can be extracted by the tape extraction unit provided that the tape is brought to said threading area, the tape is caused to face outside at the standardized threading area no matter whether the larger or lesser size cassettes are in use.

In these tape cassettes of different sizes, when the lid for opening or closing the threading area at the front side of the tape cassette is journaled at the side wall sections of the cassette proper, as in the aforementioned prior-art devices, the lid as a whole tends to be bulky in size in the case of the large size tape cassette despite the fact that the threading area is of the same design as the small size tape cassette. This is inconvenient since the lid is caused to overlie the portion of the front side of the cassette proper lying outside of the threading area along which the tape is extended and which should be in need of protection. Also the lid may be insufficient in mechanical strength.

In view of the foregoing disadvantages of the prior art tape cassette, it is an object of the present invention to provide an improved tape cassette having a novel system for mounting the lid to the cassette proper.

It is another object of the present invention to provide an improved tape cassette in which the side sections of the lid supporting the shafts about which the lid is rotated for opening or closing the threading area on the front side of the cassette are pivotally mounted at the mounting positions inwardly offset from both sides of the cassette proper. In this manner, the length of the main portion of the lid need only be sufficient to cover the threading area, so that the lid as a whole may be reduced in size and weight.

It is a further object of the present invention to provide an improved tape cassette wherein the side sections of the lid are rotatably supported at the mounting positions inwardly offset from both ends of the cassette proper whereby movable sections are not provided at the four corners of the cassette so as to elevate the strength of the cassette proper.

It is a further object of the present invention to provide an improved tape cassette wherein positive tape protection is assured by obviating the risk of inadvertent opening of the lid upon mannual handling of the tape cassette.

It is a further object of the present invention to provide an improved tape cassette wherein the lid damage caused by dropping the tape cassette may be avoided.

BRIEF DESCRIPTION OF THE DRAWINGS

FIG. 2 is a side elevation showing a tape cassette according to the present invention.

FIG. 3 is a side elevation similar to FIG. 2 and showing the lid opened.

DESCRIPTION OF THE PREFERRED EMBODIMENT

Referring to the accompanying drawings, there is shown a tape cassette according to a preferred embodiment of the present invention.

Figure 1:
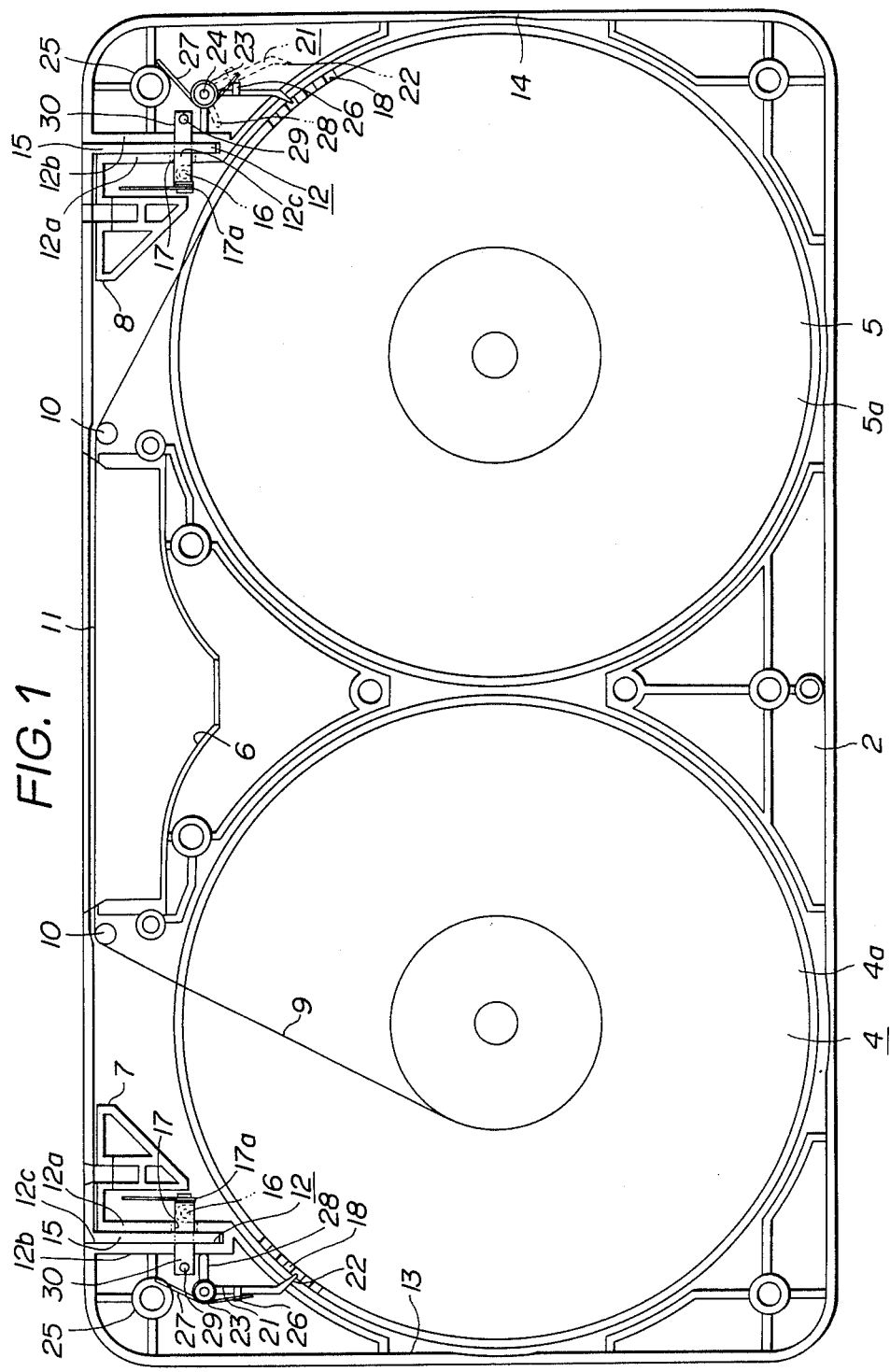
FIG. 1 is a plan view showing a lower cassette half of the tape cassette according to the present invention.
Figure 5:
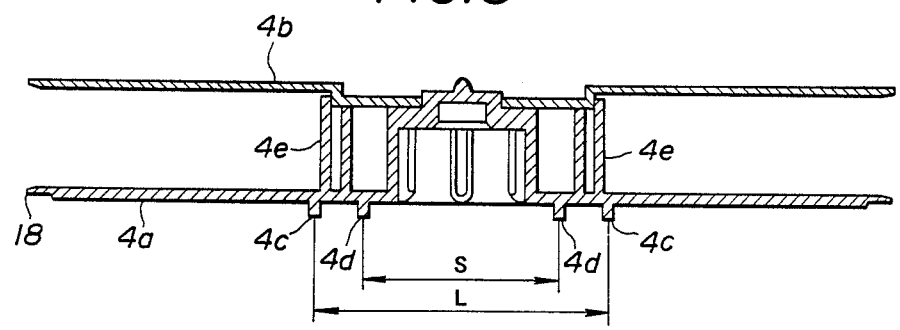
FIG. 5 is a sectional view showing a tape reel used with the tape cassette according to the present invention.

The tape cassette has a body or main member 3 comprised of an upper half cassette 1 and a lower half cassette 2 abutted to each other, as shown in FIG. 2. Within the main member 3 are rotatably mounted a pair of tape reels 4, 5, as shown in FIG. 1. The tape reel 4 is shown in section in FIG. 5 and comprised of a lower flange 4a and an upper flange 4b. The lower flange 4a has a hub surface 4e about which a magnetic tape is wound. The lower surface of the lower flange 4a has a pair of annular ribs 4c, 4d for engaging with and receiving a reel-driving reel block provided on a magnetic recording and/or reproducing device not shown. The annular rib 4c of a diameter L is adapted for cooperating with a larger size reel of a larger size tape cassette, whereas the annular rib 4d of a diameter S is adapted for cooperating with a lesser size reel of a lesser size tape cassette. These ribs 4c, 4d are selectively used for receiving the associated size reels. Centrally arranged at the front side of the main member 3 is a threading area 6 that will be confronted by a tape extraction means of the magnetic recording and/or reproducing device when the tape cassette is mounted in position within the recording and/or reproducing device. On both sides of the area 6 are formed a pair of tape extraction windows 7, 8 through which the magnetic tape 9 placed around the tape reels 4, 5 is extracted out of the main member 3 to be then extended and travel through the threading area 6. Within the tape extracting windows 7, 8 a pair of guide pins 10, 10 for guiding the tape 9 are implanted in the vicinity of the partition wall sections delimiting the threading area 6.

It is noted that center reel hubs integrally provided to the tape reels 4, 5 are engaged and locked by reel shafts of the recording and/or reproducing device introduced into the through-holes in the lower half cassette 2 such that the tape reels 4, 5 are driven in rotation in unison with the reel shafts so as to pay out or take up the magnetic tape 9.

The main member 3 of the tape cassette of the present invention is provided with a pair of holding units 12, 12 inwardly of the side wall sections 13, 14 and outwardly of the tape extraction windows 7, 8. These units 12, 12 are adapted for rotatably supporting a lid or cover 11 which overlies the portion of the tape 9 extending through the area 6 and which is used for opening or closing the threading area 6. Each holding unit 12 is formed by a pair of upright parallel wall sections 12a, 12b on the front side of the tape cassette, so that as gap 12c defined between the wall sections 12a, 12b is opened on the front and upper sides for providing a channel section.

The lid 11 mounted by means of these holding units 12, 12 is formed with angle projections 15, 15 at the left and right ends in the drawing. Each angle projection 15 is formed with a shaft 16 in the distal end thereof for rotatably supporting the lid 11 with respect to the main member 3 of the tape cassette. The shaft 16 is rotatably received in a through-hole 17 formed in one of the upright wall sections 12a. In this connection it is noted that the through-holes 17 may be provided to the abutment portions between the upper half cassette and the lower half cassette such that the shafts 16 may be readily engaged within the associated through-holes when the half cassettes 1, 2 are assembled together to a tape cassette.

Preferably, the foremost parts of the angle projections 15, 15 and the inner ends of the holding units 12 are formed on the arcuate paths centered about the shafts 16, 16 as shown in FIG. 2.

On each shaft 16 is wound a torsion coil spring 17a for urging the lid 11 into rotation in a direction of closing the front side of the main member 3 of the tape cassette.

Although not shown, a lock member is provided between the lid 11 and the main member 3 for locking the lid 11 to the main member 3.

Within a space defined between the holding units 12, 12 within the main member 3 and the side wall sections 13, 14, there is rotatably mounted a pair of reel locking levers 21, 21 engaging in one of the engaging peripheral recesses 18 of a pair of lower reel flanges 4a 5a of the tape reel 4, 5 for locking the tape reels 4, 5 for preventing unreeling of the tape 9 on the tape reels 4, 5 upon closure of the lid 11. Each reel lock lever 21 has a locking finger 22 at the distal end thereof for engaging with the engaging recesses 18 of the tape reels 4, 5. The reel lock lever 21 is provided at the proximate end thereof with a tubular journal projection 23 through which a journal pin 24 implanted on the lower half cassette 2 is introduced for rotatably supporting the reel lock lever to the main member 3. The reel lock lever 21 is urged in rotation towards the tape reels 4, 5 by a torsion coil spring 27, which is coiled about the journal projection 23 and has one end retained by a boss 25 of the lower half cassette 2 and the other end retained by a lug 26 provided halfway to the reel lock lever 21. The one side of the journal projection 23 is formed with an actuating lug 28 extending towards the interior of the main member 3 at right angles with the reel lock lever 21.

The outer side of each angle projection 15 of the lid 11 is formed with an actuating shaft 30 coaxially with shaft 16 and in opposition to the associated lug 28 of the reel lock lever 21. Each actuating shaft 30 has an actuating boss 29 adapted to press the associated lug 28. Each actuating boss 29 is implanted upright on one side of the associated shank 30. The actuating boss 29 is of a sufficient length to press the actuating lug 28 of the reel lock lever 21 in an operative correlation with the opening of the lid 11 for releasing the locking finger 22 out the engaging recesses 18 of the associated tape reel. The actuating boss 29 is mounted upright on the shank 30 such that, when the lid 11 is in the closed position as shown in FIG. 1, the boss 29 is projected upwardly of the main member 3 out of contact with the actuating lug 28.

Thus the reel lock release mechanism of the tape cassette according to the present invention is comprised of a pair of actuating shafts 30 provided to the front cover 11, a pair of actuating bosses 29, and a pair of actuating lugs 28 provided for reel lock levers 21.

Figure 4:
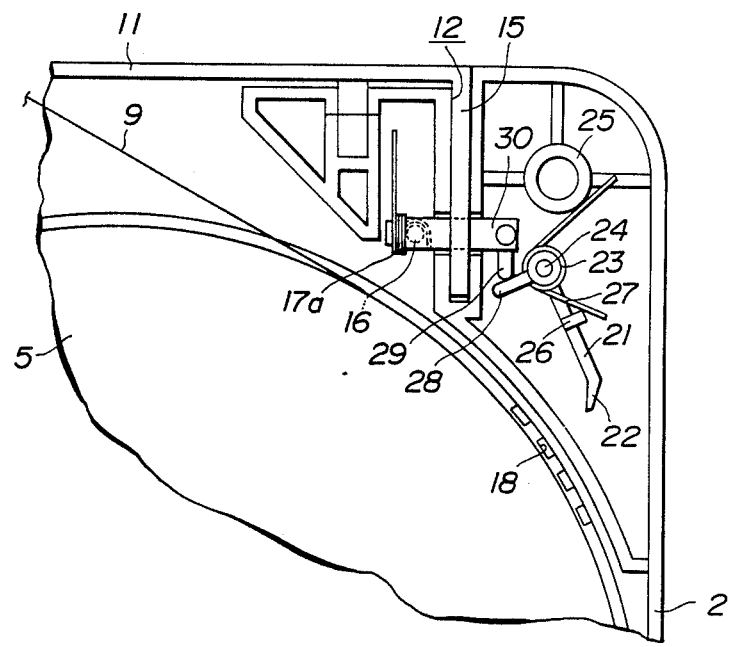
FIG. 4 is a plan view showing essential parts of the tape cassette of the present invention wih the lid opened.

In the operation of the tape cassette of the present invention, when the tape cassette is mounted in position within the recording and/or reproducing device for unlocking the cover locking means, the lid 11 is turned about the shafts 16 so that the tape 9 facing to the front side of the main member 3 is exposed at the position extending within the threading area 6 so as to permit tape extraction by the tape extraction means. As the lid 11 is opened as shown in FIG. 3, the actuating shafts 30 are turned in unison, until the actuating bosses 29 abut on the actuating lugs 28. As the lid 11 is further opened, the bosses 29 act on the lugs 28 for turning the reel lock levers 21 as shown in FIG. 4 for disengaging the locking fingers 22 out of the engaging recesses 18 of the tape reels 4, 5 so as to permit rotation of the tape reels 4, 5.

From the foregoing it is seen that the present invention provides a tape cassette in which a pair of tape reels are mounted for rotation within the main member consisting of a pair of half cassettes, the travel passage of the magnetic tape wound about these tape reels is formed along the windows opened on one front side of the main body, and a lid is rotatably mounted to the main member for opening or closing said travel passage of the magnetic tape, said lid is comprised of a main portion overlying the tape extending in said travel passage and side plate sections at the extreme ends of said main portion, these side plate portions are rotatably supported within holding units provided with an offset from the left and right side wall sections of the main member of the tape cassette, In sum, the following advantages may be derived from the above described arrangement.

(1) Since the length of the lid can be designed to be smaller than that of the main member of the tape cassette, the lid can be increased in toughness so as to be sufficiently free from deformation or the like damage.

(2) The main member of the tape cassette can be fabricated only of the upper and lower half cassette so that the cassette as a whole may be improved in toughness and impact strength.

(3) Since the side plate sections of the lid are enclosed within the main member of the cassette, there is no risk that the lid be inadvertently opened when the cassette is inserted into or taken out of the cassette device and the stable lid closing state may be assured.

In addition, since the cover or lid is pivotally mounted to the main member of the tape cassette at a position offset toward the interior from both sides of the main member of the cassette, and a release device for the tape reel lock means adapted for locking the tape reels within the main member of the tape cassette is located within the space delimited between the pivot section of the lid and the side wall sections of the main member of the tape cassette, the release device can be effectively mounted within the main member. Also, even in instances wherein the lid is lesser in length than the spacing between the tape reels, and a pair of tape extraction windows are provided on both sides of the lid, reel lock means and reel lock release means can be provided without obstructing the travel passage of the tape extracted from the tape reels.

What is claimed is:

1. A tape cassette comprising a pair of tape reels around which is placed a magnetic tape that extends from reel to reel;
   - a body member consisting of an upper half and a lower half forming a front wall section of predetermined length, and said body member being adapted for enclosing said pair of tape reels rotatably mounted therein;
   - a threading area arranaged at a front side of said body member and including an opening in said front wall section through which the magnetic tape is exposed to the outside of said body member, end portions of said front wall section of said body member extending on either side of said opening;
   - a lid adapted for selectively covering said opening in said threading area and, when in a covering position, overlying and protecting said magnetic tape in said opening;
   - said lid comprising a front wall section having a length substantially equal to a length of said opening and being less than the length of said front wall section of said body member and being adapted in said covering position to overlie said opening in said threading area, side part sections contiguous to both sides of the front wall section of said lid and being arranged substantially perpendicularly thereto and extending into said front wall section of said body member, said side part sections being substantially parallel with side wall sections of said body member, and rotary shafts for the lid formed in said side part sections; and
   - said lid being mounted for selectively covering said opening in said threading area with said rotary shafts supported by bearing means formed in said body member and arranged inwardly of said side wall sections of said body member, whereby said lid being substantially less in length than the length of said front wall section of said body member causes end portions of said front wall section of said body member to extend beyond the ends of said lid.

2. The tape cassette as claimed in claim 1 wherein reel lock means adapted to lock said pair of tape reels during non-use is provided between said side wall sections of said body member and said bearing means.

3. The tape cassette as claimed in claim 1 wherein said rotary shafts extend through respective ones of said side part sections of the lid.

4. The tape cassette as claimed in claim 2 wherein said reel lock means comprises a pair of reel lock levers, an operating surface of an actuating lug pressed by an actuating boss provided to each of said rotary shafts, and a locking finger engaging with said tape reel for locking said reel, each said reel lock lever being rotatably supported by said body member,
   - and means for urging said reel lock lever in the reel locking direction;
   - each said reel lock lever being rotated by said actuating boss pressing said operating surface against said means for urging as a result of opening the lid for disengaging said tape reel from said lock means and allowing free rotation of said tape reel.

* * * * *

UNITED STATES PATENT AND TRADEMARK OFFICE
CERTIFICATE OF CORRECTION

PATENT NO. : 4,768,122
DATED : August 30, 1988
INVENTOR(S) : Hideaki Kawada

It is certified that error appears in the above-identified patent and that said Letters Patent is hereby corrected as shown below:

Column 1, line 43, change "extrated" to --extracted--.

Column 4, line 58, change "," first occurance, to --.--

IN THE CLAIMS

Column 6, line 27, after "sections" insert --to both inner and outer sides of said side part sections--.

Signed and Sealed this

Fourteenth Day of March, 1989

Attest:

DONALD J. QUIGG

Attesting Officer

Commissioner of Patents and Trademarks